United States Patent
Yano

(10) Patent No.: US 10,282,143 B2
(45) Date of Patent: May 7, 2019

(54) INFORMATION PROCESSING APPARATUS AND CONTROL METHOD OF INFORMATION PROCESSING APPARATUS

(71) Applicant: CANON KABUSHIKI KAISHA, Tokyo (JP)

(72) Inventor: Yukari Yano, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/942,924

(22) Filed: Apr. 2, 2018

(65) Prior Publication Data

US 2018/0293031 A1 Oct. 11, 2018

(30) Foreign Application Priority Data

Apr. 10, 2017 (JP) .................. 2017-077735

(51) Int. Cl.
*G06F 3/12* (2006.01)
*H04N 1/00* (2006.01)
*G06F 16/954* (2019.01)

(52) U.S. Cl.
CPC .......... *G06F 3/1204* (2013.01); *G06F 3/1271* (2013.01); *G06F 3/1287* (2013.01); *G06F 16/954* (2019.01); *H04N 1/00411* (2013.01); *H04N 1/00503* (2013.01); *G06F 3/1222* (2013.01); *G06F 3/1288* (2013.01)

(58) Field of Classification Search
CPC ............. G06F 3/1204; G06F 17/30873; G06F 3/1222; G06F 3/1288; H04N 1/00503; H04N 1/00411
USPC ......................................... 358/1.15
See application file for complete search history.

(56) References Cited

U.S. PATENT DOCUMENTS

| | | | |
|---|---|---|---|
| 9,105,222 B2 | 8/2015 | Okamura | |
| 2009/0300538 A1* | 12/2009 | Okamura | G09G 5/00 715/779 |
| 2010/0128298 A1* | 5/2010 | Matsugashita | G06F 3/1204 358/1.13 |
| 2015/0029533 A1* | 1/2015 | Sato | G06F 3/1238 358/1.14 |

FOREIGN PATENT DOCUMENTS

JP 2002049523 A 2/2002

* cited by examiner

*Primary Examiner* — Neil R McLean
(74) *Attorney, Agent, or Firm* — Venable LLP

(57) ABSTRACT

When Web content of a specific URL is displayed, a return operation screen is displayed, and when the Web content of the specific URL is no longer being displayed, the return operation screen is hidden.

17 Claims, 12 Drawing Sheets

FIG. 6A — 600

| ITEM | URL AT WHICH RETURN MEANS DISPLAY IS REQUIRED |
|---|---|
| 1 | http://extsite1/login |
| 2 | http://extsite2/login |
| 3 | http://extsite3/login |

FIG. 6B — 610

| ITEM | URL AT WHICH RETURN MEANS DISPLAY IS REQUIRED | DISPLAY POSITION (x, y) |
|---|---|---|
| 1 | http://extsite1/login | 100, 200 |
| 2 | http://extsite2/login | 100, 200 |
| 3 | http://extsite3/login | 100, 200 |

FIG. 6C — 620

| ITEM | URL AT WHICH RETURN MEANS DISPLAY IS REQUIRED | DISPLAY POSITION (x, y) | URL OF ORIGINAL Web APPLICATION |
|---|---|---|---|
| 1 | http://extsite1/login | 100, 200 | http://server1/webapp1 |
| 2 | http://extsite2/login | 100, 200 | http://server1/webapp1 |
| 3 | http://extsite3/login | 100, 200 | http://server1/webapp1 |

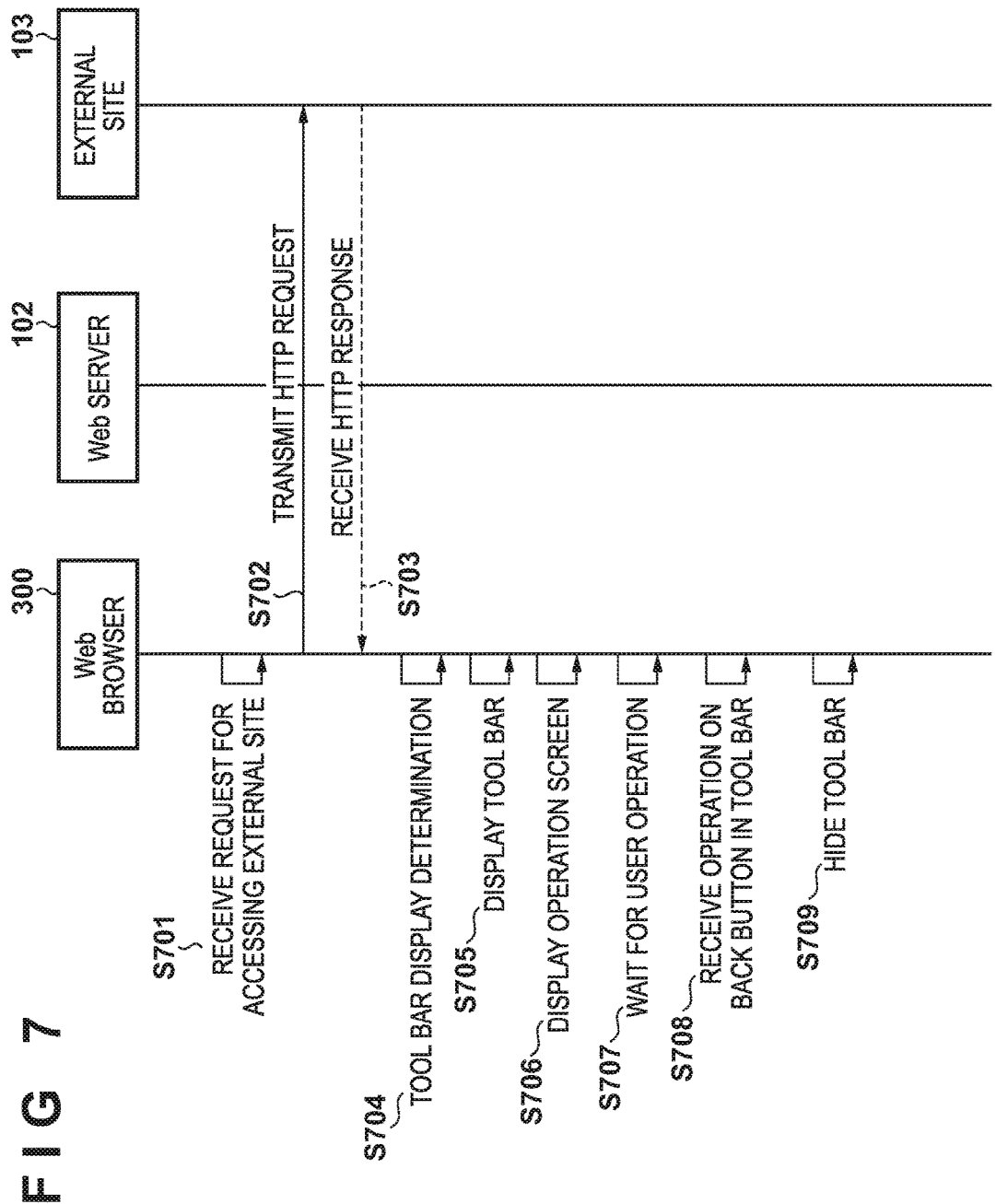

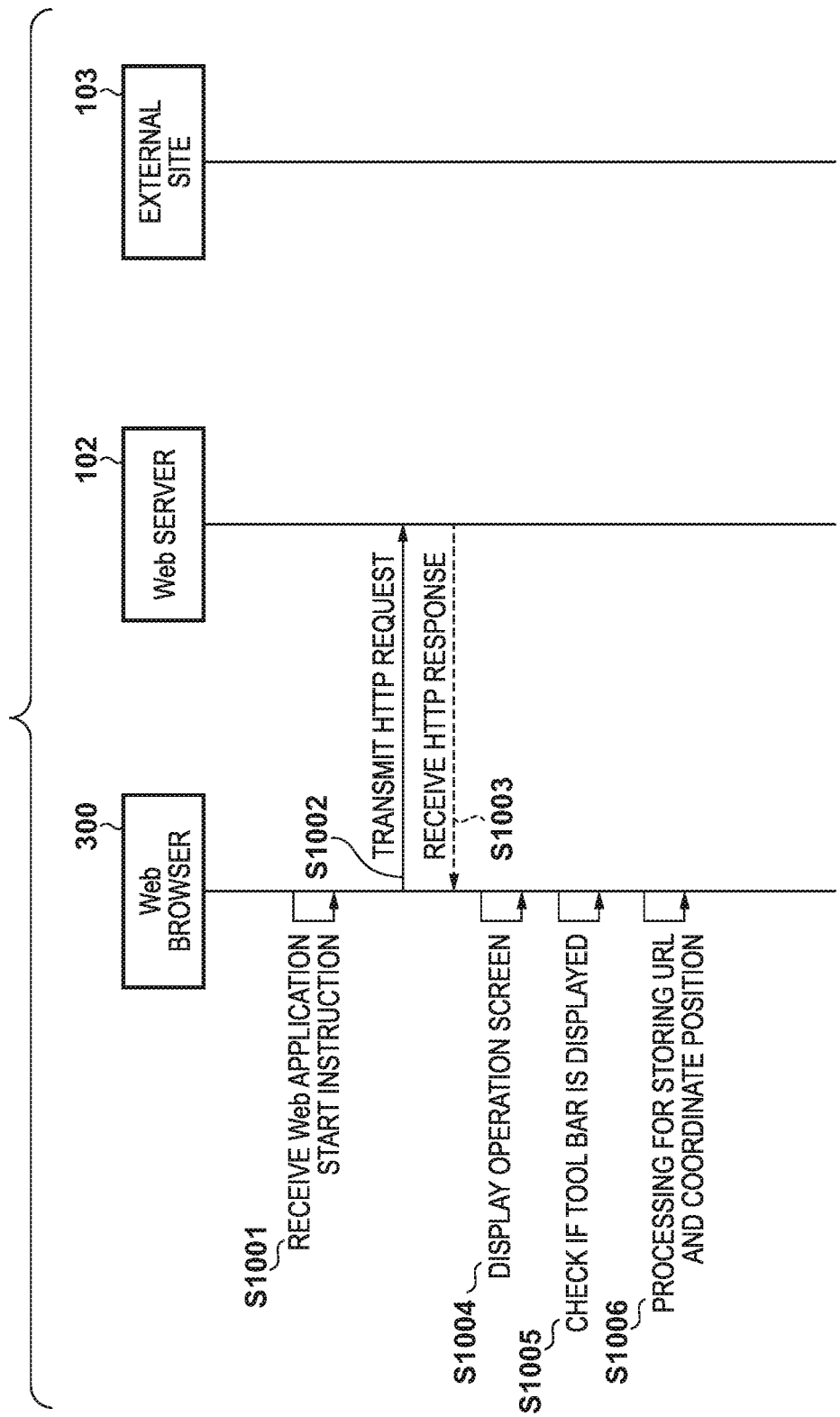

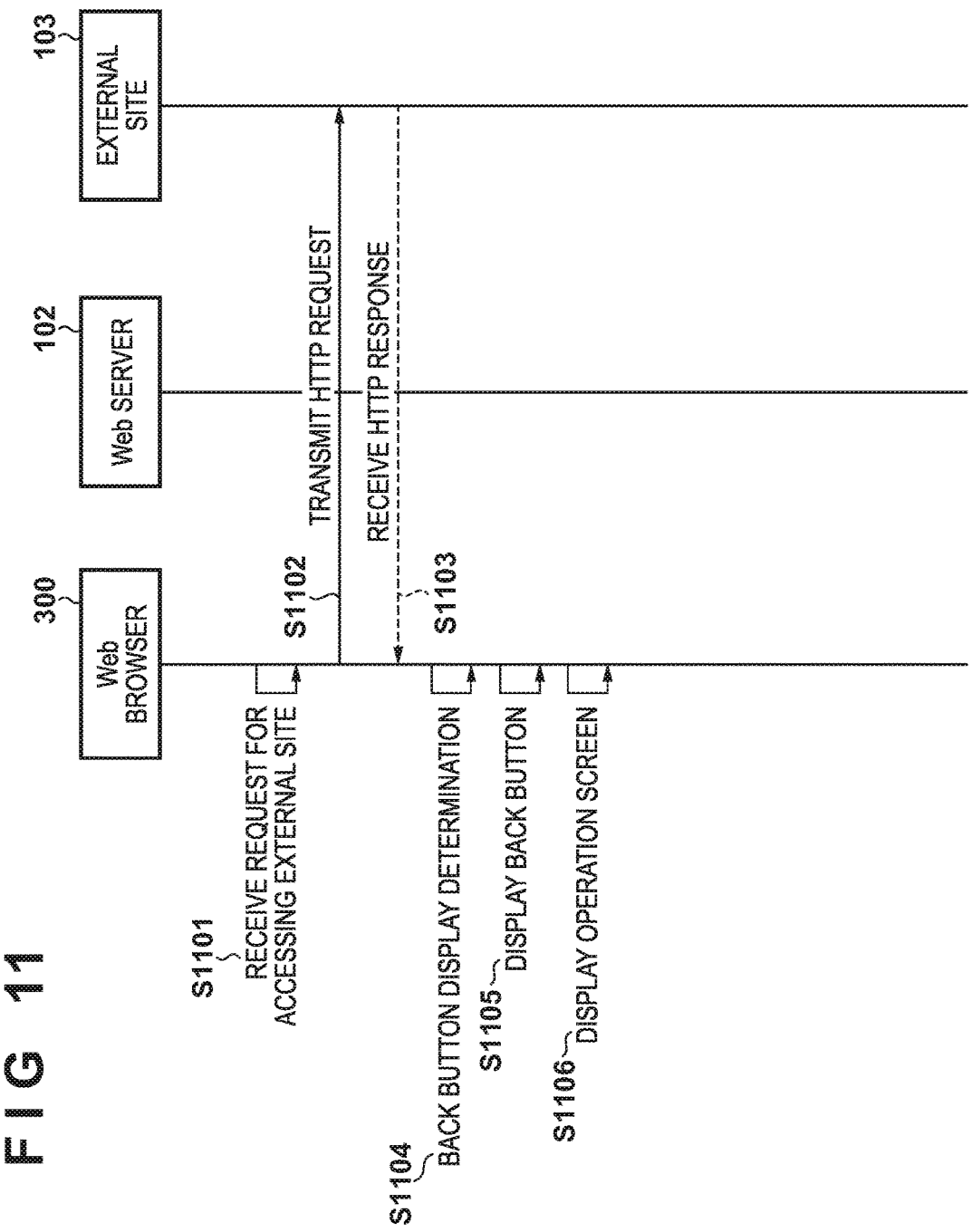

INFORMATION PROCESSING APPARATUS AND CONTROL METHOD OF INFORMATION PROCESSING APPARATUS

BACKGROUND OF THE INVENTION

Field of the Invention

The present invention relates to an information processing apparatus that is connected to a Web server, for example, and displays an operation screen and the like provided by the Web server, and a control method of the information processing apparatus.

Description of the Related Art

Recent years have seen some image processing apparatuses called MFPs (Multi Function Peripherals) equipped with a scanner and a printer, that are also provided with a Web browser. A tool bar that has GUI components for Web browser operations such as an address bar and a back button is arranged in some conventional Web browsers. Hereinafter, such a tool bar is simply referred to as a tool bar. In the case where, after transitioning from one operation screen to another operation screen, the user desires to return to the original operation screen as one type of screen transition of a Web application, a back button included in the tool bar is often used to return to the original operation screen. However, there are cases where, in devices that have a small display region such as an MFP, the tool bar is hidden as a result of a desire to save space on the screen, and if there is no "Back" button on the operation screen of the Web application, it is not possible to return to the previous operation screen.

In recent years, there is a technique for displaying/hiding a returning means using a uniquely extended HTML tag (hereinafter, referred to as an extended tag) (Japanese Patent Laid-Open No. 2002-49523). This is a technique for restraining a "Back" function or the like of a Web browser, and causing a server to control switching of page screens, and as a means for the technique, whether or not the source of a Web page includes an extended tag is determined, and a returning means is displayed/hidden.

However, in Japanese Patent Laid-Open No. 2002-49523, the HTML tag is uniquely extended, and thus a returning means can be displayed/hidden only by specific Web applications that support this extended tag. Therefore, it is not possible to solve the issue of being unable to return in the case where a transition is made to an external site that does not support the extended tag.

In addition, there is an issue in that, when a transition is made from one operation screen to another external site in the environment in which a tool bar of a Web browser is hidden, it is not possible to return from the operation screen of the external site to the original operation screen. As a result, the user is stuck in terms of operating the operation screen displayed on the Web browser while being unable to return to the original operation screen, and thus the usability is reduced.

SUMMARY OF THE INVENTION

The present invention provides an information processing apparatus that makes it possible to return to a previous operation screen even in an operation screen in which a means for returning to the previous operation screen is not provided, and a control method of the information processing apparatus.

In order to achieve the above purpose, the present invention has the following configuration.

Specifically, according to an aspect of the present invention, there is provided an information processing apparatus comprising: at least one processor and at least one memory coupled to each other and cooperating to act as: a user interface that enables display on a screen and an operation performed by a user; an acquisition unit configured to acquire content from a designated location; and a control unit configured to, when displaying the content, additionally display, on the user interface, an operation portion for returning to a previous screen, if the location is a predetermined location.

According to the present invention, even in an operation screen in which a means for returning to the previous operation screen is not provided, it is possible to return to the previous operation screen. This improves the usability.

Further features of the present invention will become apparent from the following description of exemplary embodiments with reference to the attached drawings.

BRIEF DESCRIPTION OF THE DRAWINGS

FIGS. 6A to 6C show tables in an embodiment of the present invention.

FIG. 7 is a diagram showing a sequence for displaying a tool bar in the case of a URL for which tool bar display is required, in an embodiment of the present invention.

FIG. 10 is a diagram showing a sequence for storing information regarding URLs for which the display of a back button is required and coordinate positions for back button display, in an embodiment of the present invention.

FIG. 11 is a diagram showing a sequence for displaying a back button at a designated coordinate position in the case of a URL for which back button display is required, in an embodiment of the present invention.

DESCRIPTION OF THE EMBODIMENTS

Modes for implementing the present invention will be described below with reference to the drawings.

First Embodiment (Tool Bar Display)

Figure 1:
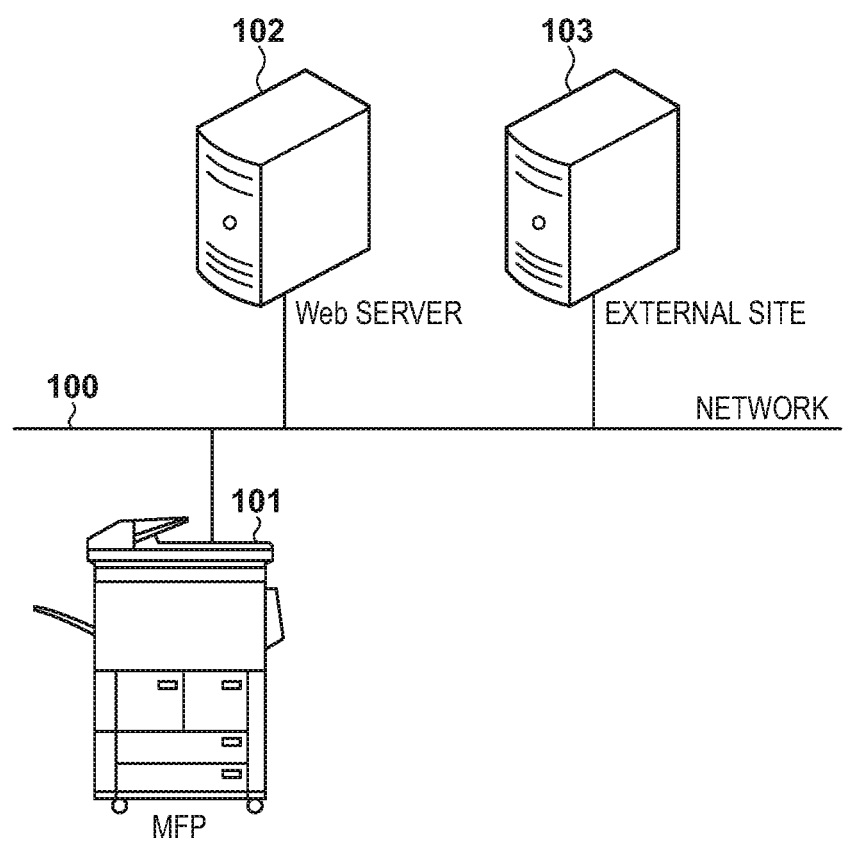
FIG. 1 is a diagram of the entirety of a system in which an MFP in an embodiment of the present invention is connected.

FIG. 1 is a configuration example of a system in which an image processing apparatus of the present invention is used. This system includes an MFP 101 that is an image processing apparatus connected via a network 100, and a Web server 102. The network 100 is a base for performing communication between apparatuses, and may be connected to the Internet. The MFP 101 is an MFP (Multiple Function Peripheral) equipped with a Web browser. The MFP has functions of specific usages such as printing, image duplication, and image capturing using a scanner, and functions as a general-purpose information processing apparatus as a result of being equipped with a Web browser, or the like. Note that, as long as a Web browser function is provided, this embodiment is not limited to an MFP, and can be applied to other types of apparatuses. The Web server 102 is connected to the MFP 101 via a network, and has a function for distributing Web contents via the network. The Web server 102 provides Web contents according to a request from the MFP 101. Apparatuses may be on a local network, or may be connected over the Internet. In addition, the Web server 102 may be included in the MFP 101 as a function of the MFP 101. An external site 103 is another Web server that is external to the MFP 101 and the Web server 102.

Hardware Configuration

Figure 2:
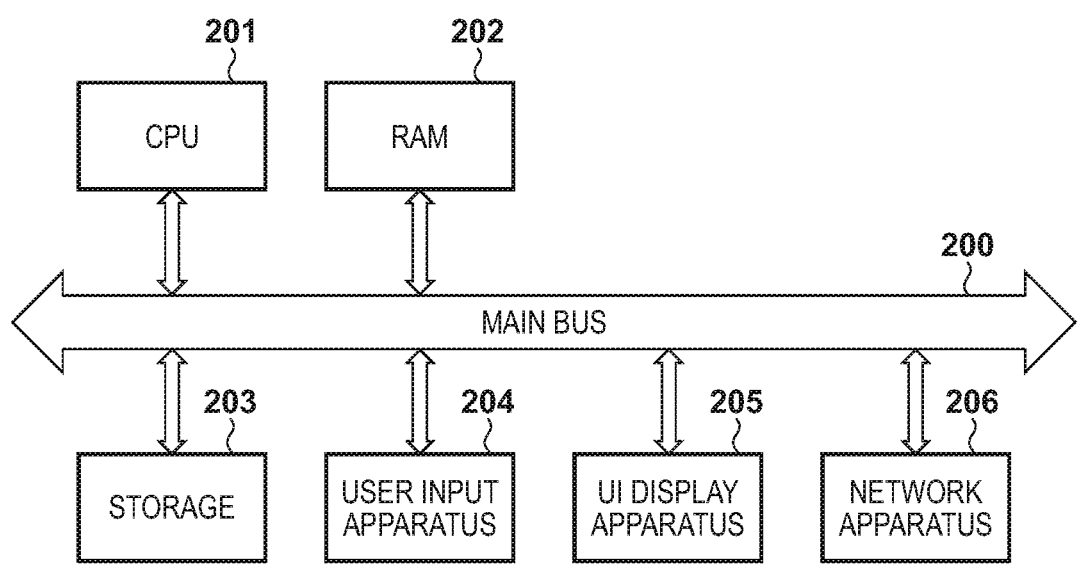
FIG. 2 is a block diagram showing the hardware configuration of the MFP and a Web server in an embodiment of the present invention.

FIG. 2 shows an example of the hardware configuration of the MFP 101 and the Web server 102 of this embodiment. A CPU 201 for controlling the MFP 101 and the Web server 102, a RAM 202 that provides a work area for the CPU 201, and a storage 203 (which may be an HDD, an NVRAM, or the like) that stores programs executed by the MFP 101 and the Web server 102 and various settings are included. Furthermore, the hardware configuration includes a user input apparatus 204 through which the user inputs commands, a UI display apparatus 205 that performs screen display, a network apparatus 206 that performs communication with another device using a network, and a main bus 200. Note that, in this embodiment, for the MFP 101 and the Web server 102, the CPU 201 controls the RAM 202, the storage 203, the user input apparatus 204, the user interface (UI) display device 205, and the network apparatus 206 via the main bus 200, unless specifically stated otherwise. In addition, the UI display apparatus 205 may also serve as the user input apparatus 204, such as a touch panel display. However, the Web server 102 does not need to have the user input apparatus 204 and the UI display apparatus 205. In addition, in the MFP 101, an image reading apparatus and an image printing apparatus may be additionally connected to the main bus 200.

Software Configuration of MFP

Figure 3:
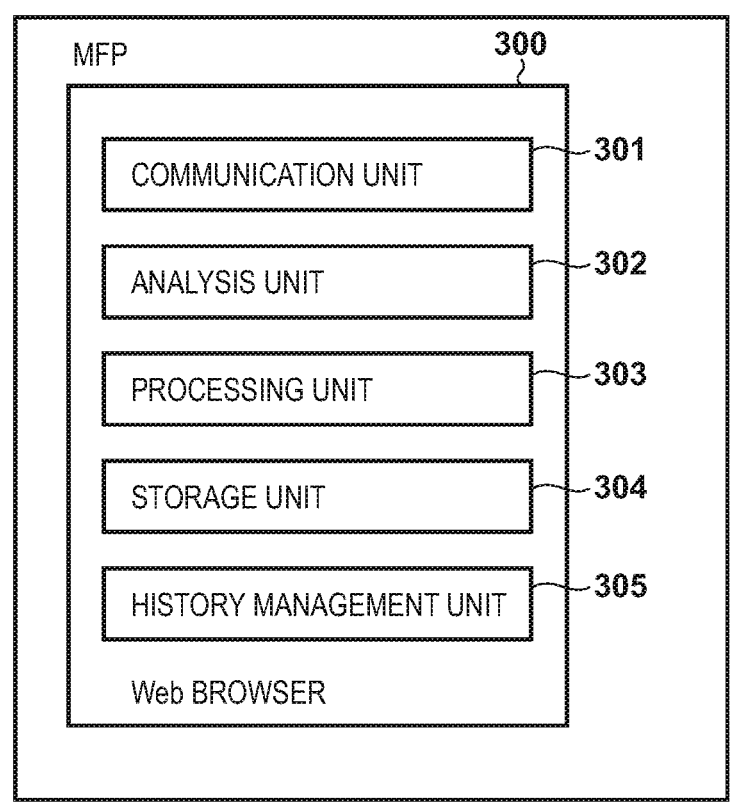
FIG. 3 is a diagram showing the software configuration of the MFP in an embodiment of the present invention.

FIG. 3 is a diagram for explaining the software configuration of the MFP 101 in this embodiment. The function units shown in FIG. 3 are realized by the CPU 201 of the MFP 101 executing control programs.

The MFP 101 has a Web browser 300. It suffices for the Web browser 300 to have a function for acquiring Web contents by communicating with any server and displaying the Web contents on a screen. The Web browser 300 has a communication unit 301, an analysis unit 302, a process unit 303, a storage unit 304, and a history management unit 305. In the Web browser 300 on the MFP 101, a state where a tool bar is hidden is set as a normal in-use form.

The communication unit 301 communicates with the Web server 102 in accordance with an HTTP protocol. More specifically, when the Web browser 300 is started, the communication unit 301 transmits a request to the Web server 102, and receives Web content as a response.

The analysis unit 302 analyzes the response received from the Web server 102. HTML data that is a description indicating the content of an operation screen to be displayed in the Web browser 300 and JavaScript (registered trademark) that is applied to the operation screen are written in the response. Hereinafter, these are collectively referred to as Web content.

The processing unit 303 displays the Web content on the UI display apparatus 205 based on the result of analysis performed by the analysis unit 302, and executes JavaScript (registered trademark) if JavaScript (registered trademark) is included.

The storage unit 304 stores data that is used by the Web browser 300. The data that is stored includes information regarding URLs for which the display of a back button is required, coordinate positions for back button display, and the URL of a Web application that instructed storing of the URL information, and is a source of the URL information that is stored. URL stands for Universal Resource Locator, and is information indicating the location of a resource such as Web content.

The history management unit 305 manages history information of URLs viewed on the Web browser 300. The history information includes accessed URLs, contents of title elements of HTML (hereinafter, referred to as title names), and favicon data. A favicon refers to an icon that serves as a symbol of a website or the like, for example.

URL Storing Sequence

Figure 4:
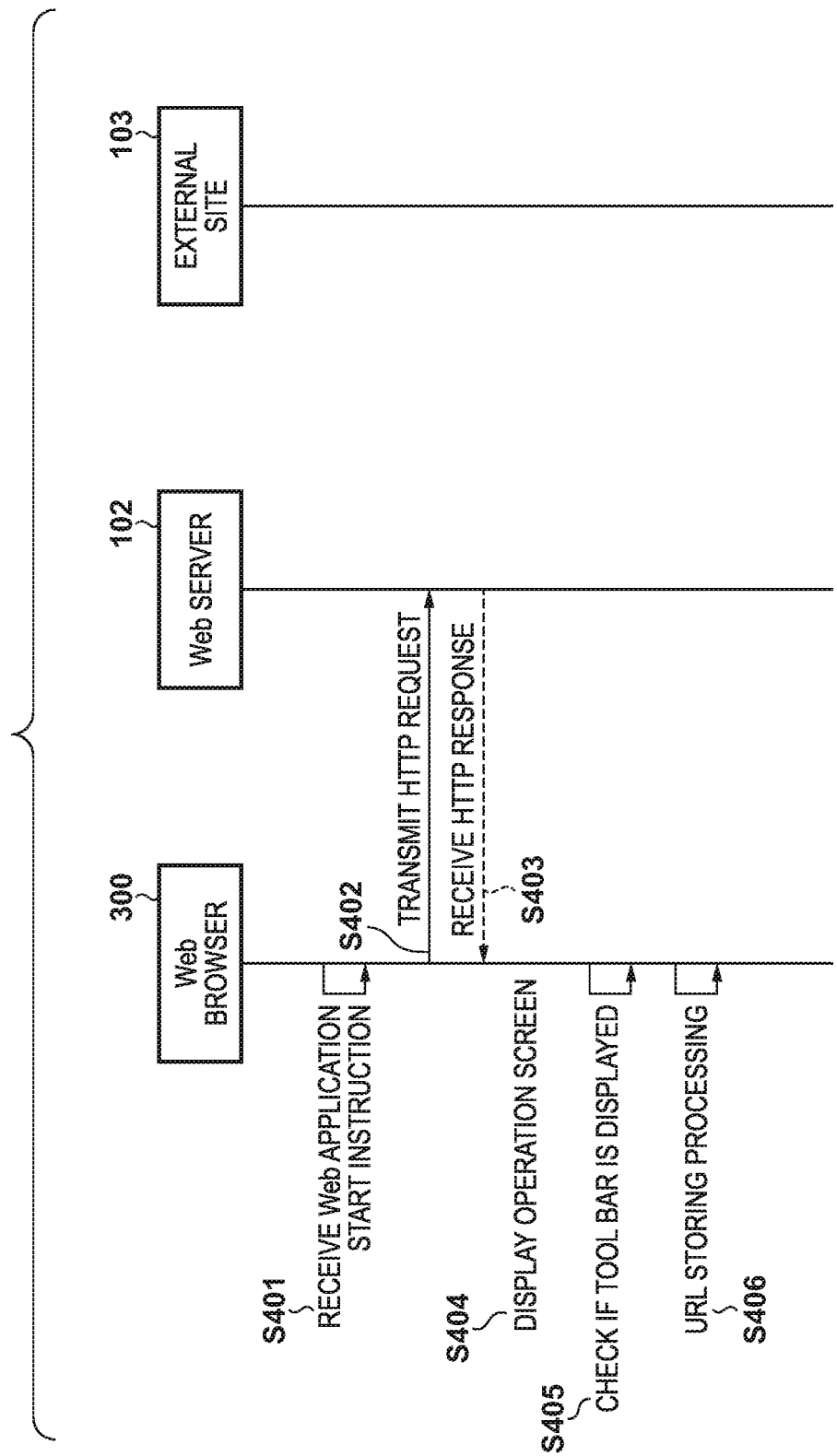
FIG. 4 is a diagram showing a sequence for storing URLs for which tool bar display is required, in an embodiment of the present invention.

FIG. 4 is a diagram showing a sequence for storing a URL for which tool bar display is required after the Web browser 300 has acquired Web content from the Web server 102. In step S401, the Web browser 300 receives an instruction to start a Web application in accordance with a user's instruction.

In step S402, the Web browser 300 transmits an HTTP request to the Web server 102 via the communication unit 301.

In step S403, the Web browser 300 receives Web content as an HTTP response from the Web server 102. The received Web content includes script data for determining whether or not a tool bar is being displayed and information regarding URLs that require tool bar display. The URL information represents URLs for which the display of a tool bar is required since the external site 103 does not have a returning means, and is used when determining the necessity of a tool bar display when accessing the external site 103. There are cases where the content of the Web content received from the Web server 102 by the Web browser 300 includes an element that includes the location of a resource to be separately referenced (e.g., an image and an HTML content) such as a link element. In that case, there are cases where the resource to be separately referenced that is indicated as a location by the element (hereinafter, referred to as a sub resource) has not been received. Therefore, in that case, subsequent to step S403, a step for transmitting/receiving, to/from the Web server 102, an HTTP request/response for/to obtaining the sub resource that has not been received may be required.

Figure 9A:
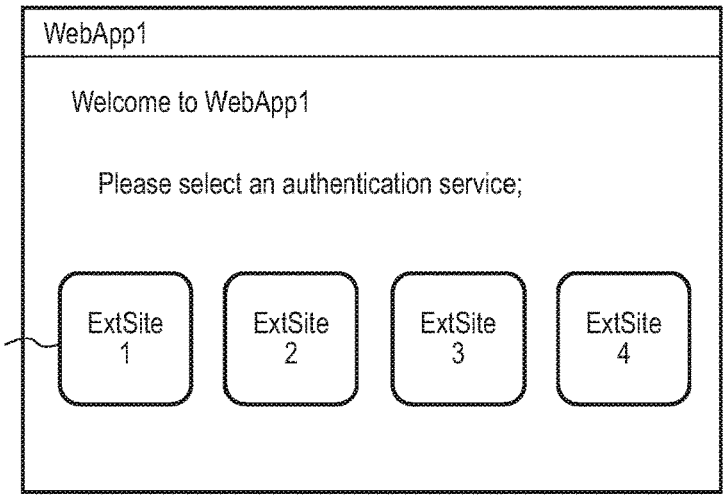
FIGS. 9A to 9C show an example of a result of display on a UI display apparatus 205 in an embodiment of the present invention.

In step S404, the Web browser 300 causes the analysis unit 302 to analyze the received Web content, and displays the result on the UI display apparatus 205. FIG. 9A shows an example of the displayed result. In FIG. 9A, options of sites for an authentication service that performs authentication that needs to be performed before the Web application is accessed are indicated as buttons 911 or the like.

In step S405, the Web browser 300 causes the processing unit 303 to execute the script data for determining whether or not a tool bar is being displayed, the script data being included in the Web content received in step S403. As a method for determining whether or not a tool bar is being displayed, a method for checking the size of the operation screen of the Web browser 300 may be used, or a method for performing the check through an API provided by the Web browser 300 may be used. In the method for checking the size of the operation screen, for example, a configuration can be adopted in which the vertical and horizontal sizes of the operation screen are obtained from the Web browser, and, in the case of full screen display, it is determined that a tool bar is not displayed, and, in the case of non-full screen display, it is determined that a tool bar is displayed. In the method for performing the check through an API, for example, an API that can determine whether or not a tool bar is being displayed is used for determining whether or not the Web browser 300 is displaying a tool bar.

In step S406, the Web browser 300 executes script data for storing the information regarding URLs for which tool bar display is required, the information being included in the Web content received in step S403, and stores, in the storage unit 304, the information regarding URLs for which tool bar display is required. This script data may be included in the Web content received in step S403, or the Web browser 300 may overwrite the received Web content so as to insert this script data. The information regarding URLs that is stored in the storage unit 304 may be deleted at the timing when the operation screen switches to a URL for which a returning means is not required, may be deleted at the timing of logout from the authentication service, or may be deleted at the timing when the Web application is switched.

Flow in which Web Browser Stores URLs at which Tool Bar Display is Required

Figure 5:
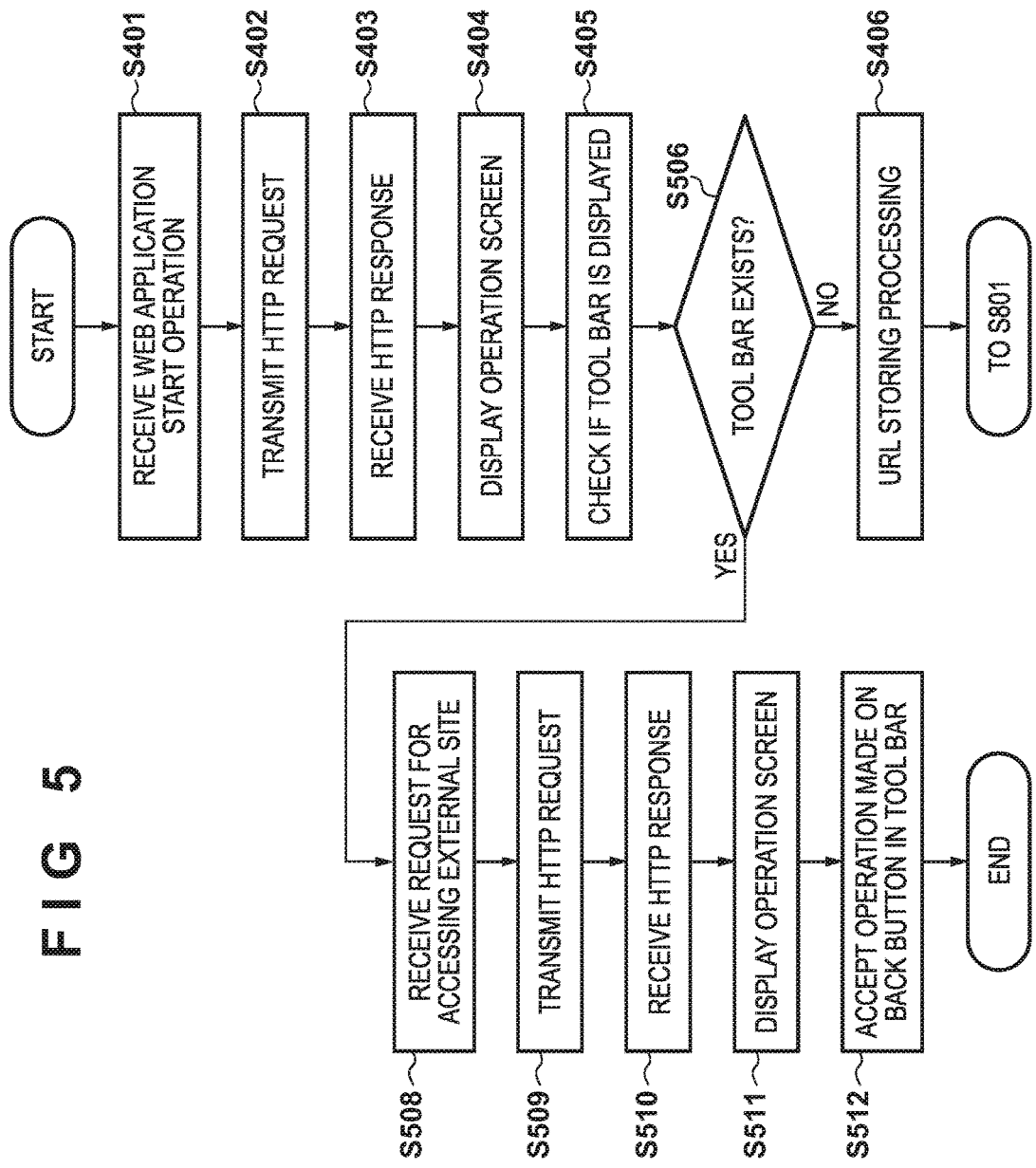
FIG. 5 shows a flow for storing URLs for which tool bar display is required, in an embodiment of the present invention.

FIG. 5 shows a flow for storing URLs for which tool bar display is required when the Web browser 300 obtains Web content from the Web server 102. Steps S401 to S405 are as shown in FIG. 4. In step S506, the processing unit 303 of the Web browser 300 determines whether or not a tool bar is being displayed, from the result of the processing unit 303 making a determination in the above step S405 as to whether or not a tool bar is being displayed. If a tool bar is being displayed in the Web browser 300, the current URL is not required to be registered as a URL for which tool bar display is required. Thus, it is determined in step S506 whether or not a tool bar is being displayed. If a tool bar is not displayed, the procedure transitions to step S406. Here, URLs that are included in the Web content received in step S403, and for which tool bar display is required are stored. If a tool bar is being displayed, the procedure transitions to step S508. After the processing in step S406, the procedure transitions to step S701 or S801. Such processing will be described later with reference to FIGS. 7 and 8.

In step S508, the Web browser 300 receives a request to access the external site 103. Here, it is assumed that a link button to the external site 103 was pressed from a display screen received from the Web server 102. For example, in FIG. 9A, the user is prompted to select another authentication server, and the selected authentication server is accessed. In this example, when a button corresponding to an authentication server is pressed, the Web browser 300 receives it as the access request in step S508.

In step S509, the Web browser 300 transmits an HTTP request to the external site 103 via the communication unit 301.

In step S510, the Web browser 300 receives Web content as an HTTP response from the external site 103. If the content of the received Web content includes an element including the location of a resource (e.g., an image, or HTML content) that is to be separately referenced such as a link element, there are cases where the resource at the location indicated by the element (hereinafter, referred to as a sub resource) is not received. Therefore, in that case, subsequent to step S510, a step of transmitting/receiving, to/from the external site 103, an HTTP request/response for obtaining the sub resource that has not been received is required in some cases.

Figure 9B:
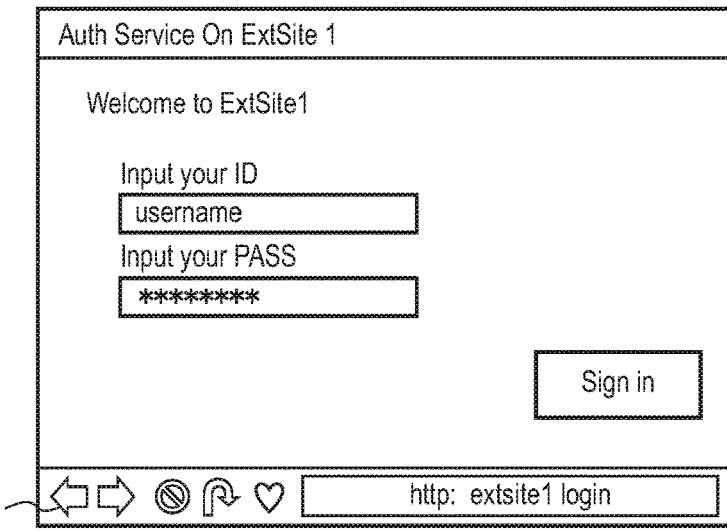

In step S511, the Web browser 300 causes the analysis unit 302 to analyze the received Web content, and displays the result on the UI display apparatus 205. FIG. 9B shows an example of the displayed result.

In step S512, the Web browser 300 accepts an operation made by the user 110 on the back button in the tool bar. As a result, Web content that was displayed immediately before the Web content in which the back button was pressed is displayed.

Above steps S508 to S512 represent a flow in the case where a tool bar was displayed in the Web browser 300 in advance.

Processing Procedure for Web Contents in which Tool Bar is not Displayed

FIG. 6A is a diagram showing a table of URLs (hereinafter, referred to as a URL table) 600 for which a tool bar stored in the storage unit 304 of the Web browser 300 is required to be displayed. In the example in FIG. 6A, URLs for which the display of a tool bar is required are recorded in items 1 to 3 of the URL table 600. These URLs correspond to URL information that was stored step S406 in FIG. 5, and are URLs of pieces of Web content in which a tool bar is not displayed.

FIG. 7 is a diagram showing a sequence for displaying a tool bar in the case of a URL for which tool bar display is required. When the Web browser 300 obtains Web content from the external site 103, if it is determined in step S405 that the Web browser 300 is not displaying a tool bar, tool bar display determination is performed. In the tool bar display determination, in the case of a URL for which tool bar display is required, the URL is stored. In the procedure in FIG. 7, subsequently, when displaying the Web content of the stored URL, a tool bar or an alternate object is also displayed along with the Web content.

In step S701, the Web browser 300 receives a request for accessing an external site according to a user's instruction.

In step S702, the Web browser 300 transmits an HTTP request to the external site 103 via the communication unit 301.

In step S703, the Web browser 300 receives Web content as an HTTP response from the external site 103.

In step S704, the Web browser 300 reads out the first URL from the URL table 600 stored in the storage unit 304. The URL that has been read out is compared to the URL of the accessed site when the HTTP request was transmitted in step S702. In other words, the URL of the accessed site when the HTTP request was transmitted in step S702 is compared to a predetermined URL. If the URLs do not match, the next URL is repeatedly read out from the URL table 600 and compared to the URL of the accessed site when the HTTP request was transmitted in step S702, on the condition that the number of repetitions does not exceed the number of URLs stored in the URL table 600.

In step S705, if, in step S704, a URL in the URL table 600 matches the accessed URL when the HTTP request was transmitted in step S702, the Web browser 300 displays a tool bar including a "Back" button, namely a "Back" operation portion, on the UI display apparatus 205. If the accessed URL is compared to all of the URLs in the URL table 600, and the accessed URL matches none of the URLs, the Web browser 300 does not display a tool bar.

In step S706, the Web browser 300 causes the analysis unit 302 to analyze the received Web content, and displays the result on the UI display apparatus 205. FIG. 9B shows an example of the display result. In this example, a tool bar 921 is displayed.

In step S707, the Web browser 300 waits for an operation to be made by the user on the back button.

In step S708, the Web browser 300 accepts an operation of the back button of the tool bar from the user. Here, the back button does not need to be operated by the user, and may be operated by a script that simulates a user's operation.

In step S709, the Web browser 300 hides the tool bar displayed in the Web browser.

Tool Bar Display Flow

Figure 8:
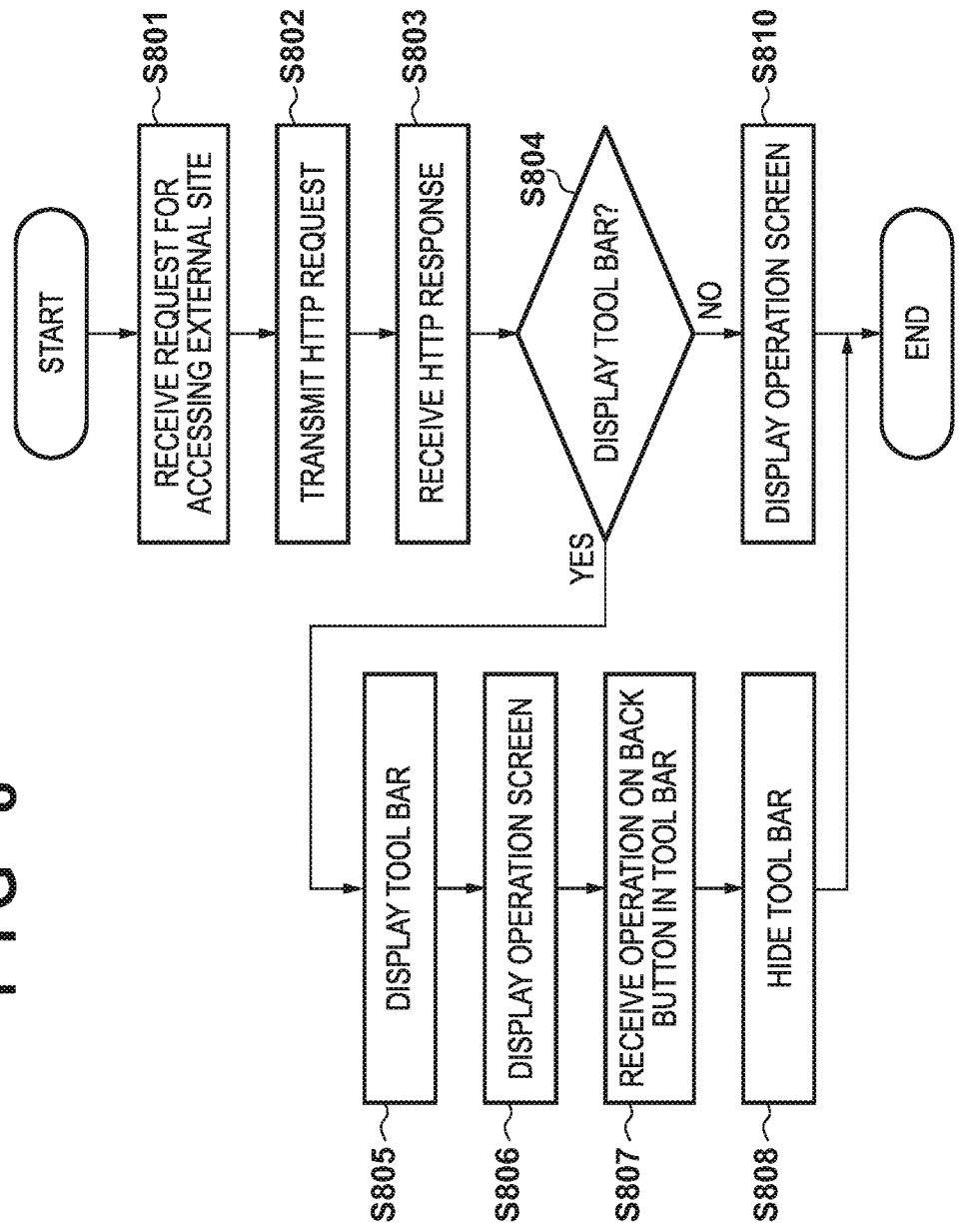
FIG. 8 shows a flow for displaying a tool bar in the case of a URL for which tool bar display is required, in an embodiment of the present invention.

FIG. 8 is a diagram showing a flow for displaying a tool bar (or an alternate object and the like) in the case of a URL for which tool bar display is required. When the Web browser 300 obtains Web content from the external site 103, if it is determined in step S506 that a tool bar is not displayed in the Web browser 300, tool bar display determination is performed as shown in FIG. 8. In the tool bar display determination, in the case of a URL for which tool bar display is required, a tool bar is displayed. Steps S801 to S806 are respectively the same as the above steps S701 to 706. Accordingly, step S805 is the same as step S705. Step S807 includes steps S707 and S708. Step S808 corresponds to step S709.

In step S810, if it is determined in step S804 that a tool bar is not to be displayed, the Web browser 300 displays an operation screen without displaying a tool bar.

Steps S801 to S808 differ from steps S508 to S512 in that processing for hiding/displaying a tool bar is included. If it is determined in step S506 that a tool bar is being displayed, it is not necessary to display/hide the tool bar, and thus processing for displaying/hiding a tool bar is not included in steps S508 to S512.

FIG. 9A shows an example of the result displayed on the UI display apparatus 205 in step S404. The operation screen includes four links to external sites.

FIG. 9B is an example of the result of Web content of the external site being displayed on the UI display apparatus 205 in steps S706 and S806. Since a URL included in the URL table 600 is being accessed, the tool bar 921 including a back button 922 is displayed in the lower portion of the Web browser.

Due to the configurations described above, the Web browser 300 on the MFP 101 displays a tool bar including a "Back" button in the environment where the tool bar of the Web browser 300 is hidden, in order to make it possible to return from an operation screen of an external site to the original operation screen. The Web browser 300 manages URL transition as history, and it is possible to return to the immediately previous screen by pressing the "Back" button. In addition, in the environment where a tool bar is not displayed, a tool bar including a "Back" button is displayed in addition to Web content obtained by accessing a designated URL. With such a configuration, the Web server can control Web contents that allow a "Back" operation and Web contents that do not allow a "Back" operation. Note that a "previous screen" that is returned to by using a "Back" button refers to a screen corresponding to content that is switched according to URL change, for example. For example, when content obtained by designating a first URL is displayed, and, next, a second URL is designated by a link included in the content or is newly designated, a content corresponding to the URL is displayed. In this state, the content obtained from the first URL is equivalent to the "previous screen". As described above, in the case where the time series of the URLs of accessed sites is taken into consideration, an operation of going back through the time series from the current display state by one stage is equivalent to a "Back" operation.

Due to the above configuration, it is possible to prevent the user from being unable to return from an operation screen of an external site to the original operation screen and being stuck in terms of operations, and thus the usability can be improved.

Second Embodiment (Back Button Display)

Next, a second embodiment of the present invention will be described.

In the first embodiment, a tool bar is provided as a returning means for the user, but a returning means does not need to be a tool bar, and a returning operation can be realized simply by providing a back button. Furthermore, if a returning means is provided in a tool bar as in the first embodiment, the screen becomes smaller, and thus the layout of the screen collapses, and a region in which no operation can be performed without scrolling the screen appears, thus reducing the usability. Therefore, in the second embodiment, overlay display (floating display) of only a back button is adopted, where the back button overlaps the operation screen. Portions described in the first embodiment are omitted below.

FIG. 10 is a diagram showing a sequence for storing information regarding URLs for which the display of a back button is required and coordinate positions for back button display, when a Web browser 300 acquires Web content from a Web server 102. Steps S1001 and S1002 are the same as steps S401 and S402 in FIG. 4.

In step S1003, the Web browser 300 receives Web content as an HTTP response from the Web server 102. The received Web content includes script data for checking whether or not a tool bar is being displayed, information regarding URLs for which the display of a back button is required, and coordinate positions for back button display. The URL information represents URLs for which the display of a back button is required since the operation screen of an external site 103 does not have a returning means, and is used when the necessity of back button display is determined when accessing the external site 103. The coordinate positions for back button display are used when displaying a back button on the operation screen of the Web browser 300. FIG. 6B is a diagram showing a table in which the information regarding URLs for which the display of a back button is required and the coordinate positions for back button display, which are stored in a storage unit 304 of the Web browser 300, are stored as sets (hereinafter, the table is referred to as a URL-with-position table 610). In the URL-with-position table 610, the information regarding URLs for which the display of a back button is required and the coordinate positions for back button display are stored as sets in items 1 to 3.

Steps S1004 and S1005 are the same as steps S404 and S405 in FIG. 4.

In step S1006, the Web browser 300 causes a process unit 303 to execute script data for storing the information regarding URLs for which back button display is required and the coordinate positions, which are included in the Web content received in the above step S1003. This script data may be included in the Web content received in step S1003, or the Web browser 300 may overwrite the received Web content so as to insert this script data. The obtained information regarding URLs that require back button display and the coordinate positions are then stored in the storage unit 304 of the Web browser 300.

Next, description will be given regarding processing when a link button to the external site 103 is pressed on an operation screen of the Web browser 300.

FIG. 11 is a diagram showing a sequence for determining whether or not a back button is displayed, when the Web browser 300 obtains Web content from the external site 103, and, in the case of a URL for which back button display is required, displaying a back button at a designated coordinate position. Steps S1101 to S1103 and S1106 are respectively the same as steps S701 to S703 and S706 in FIG. 7.

It is determined in step S1104 whether or not a URL that matches the URL when an HTTP request was transmitted in step S1102 is registered in the URL-with-position table 610. This applies to the case where the URL-with-position table 610 is used in place of the URL table 600 in step S704.

If, in step S1104, a URL in the URL-with-position table 610 matches the URL when the HTTP request was transmitted in step S1102, a coordinate position corresponding to the matched URL is read out from the URL-with-position table 610 in step S1105. The Web browser 300 displays a back button on the UI display apparatus 205 at the coordinate position that has been read out. In the case where the URL at the time when the HTTP request that was transmitted in step S1102 is compared to all of the URLs in the URL table 610, and the URL matches none of the URLs, the Web browser 300 does not display the back button. Here, if the URL-with-position table 610 does not include information regarding coordinate positions, a tool bar may be displayed as described in the first embodiment. In addition, a configuration may be adopted in which an appropriate position is set as a default position, and the tool bar is displayed at the position.

As described above, by displaying a "Back" button in place of displaying a tool bar, it becomes possible to effectively use the display space even in a small screen, and thus the convenience of the user can be improved.

Third Embodiment (Favicon Display)

Next, a third embodiment of the present invention will be described. In the second embodiment, there is an issue in that a return destination is difficult to recognize with only a back button. Therefore, in the third embodiment, a back button is displayed with a favicon or information regarding an application name added thereto such that the return destination becomes noticeable and easy to identify. Note that a favicon refers to an icon displayed in an address bar or the like of a Web browser, and is used as a symbol mark or an image of the website. Portions described in the first and second embodiments are omitted below.

A means for a Web browser 300 to acquire favicon information will be described with reference to FIGS. 10 and 11 shown in the second embodiment.

In step S1003, the Web browser 300 receives Web content as an HTTP response from a Web server 102. Here, in the received Web content, favicon data is received as a sub resource in addition to script data for checking whether or not a tool bar is being displayed, information regarding URLs for which the display of a back button is required, and coordinate positions for back button display. The received favicon data is stored in a history management unit 305 of the Web browser 300 in association with accessed URLs, and is managed.

In step S1105, favicon data of the URL of a return destination is read out from the history management unit 305, and a process unit 303 of the Web browser generates a UI component by combining the favicon data and the back button. The Web browser 300 displays the generated UI component on a UI display apparatus 205.

Next, a means for the Web browser 300 to acquire an application name will be described with reference to FIGS. 10 and 11 shown in the second embodiment. Only differences from the second embodiment will be described.

In step S1003, the Web browser 300 receives Web content as an HTTP response from the Web server 102. Here, the content of title elements (title names) are received as a portion of the Web content, in addition to script data for checking whether or not a tool bar is being displayed, information regarding URLs for which back button display is required, and coordinate positions for back button display. The received title names are stored in association with accessed URLs in the history management unit 305 of the Web browser 300, and are managed.

Figure 9C:
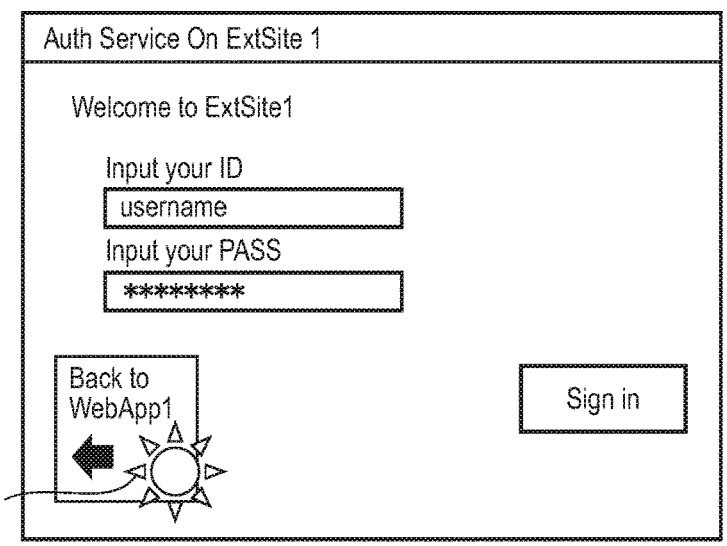

In step S1105, the content of the title element of the URL of a return destination (title name) is read out from the history management unit 305, and the processing unit 303 of the Web browser generates a UI component by combining a back button and the title name. The Web browser 300 displays the generated UI component on the UI display apparatus 205. FIG. 9C shows an example of a back button in which a favicon and an application name are used. In FIG. 9C, both a favicon and application name are displayed, and, for this, it suffices for the favicon data and the title name to be included in a piece of content provided by the Web server in response.

As described above, a returning destination is displayed so as to be easily identified, by adding content-related objects such as a favicon and an application name when providing a "Back" button, and thus the usability can be improved.

Note that in the above embodiment, data held in the MFP 101 can also be used as a favicon and an application name.

Fourth Embodiment (Derived URL can be a Target)

Next, a fourth embodiment of the present invention will be described. In the first to third embodiments, the premise is that the Web application on the Web server 102 recognizes external sites that require returning means display. However, there are cases where, while the user is operating a screen of an external site, the screen transitions to another external site that is not recognized by the Web application on the Web server 102. The Web browser 300 on the MFP 101 has a small display region, and there is a desire to save space on the screen, and thus a state where a tool bar is hidden is often set as a normal in-use form. Therefore, an address bar is not displayed, and thus the screen does not directly transition to a yet another external site that is not recognized by the Web application. However, there are cases where, by clicking on a link in a page of an external site that is recognized by the Web application, the screen transitions to yet another external site that is not recognized by the Web application. In the fourth embodiment, a URL derived and linked from a page of a URL stored in a URL table 600 or a URL-with-position table 610 is also a target for displaying a returning means.

In this embodiment, in step S406 in FIG. 4 and step S1006 in FIG. 10, the URLs of original Web applications are stored along with URLs for which returning means display is required in addition to the URL table 600 or the URL table 610. FIG. 6C shows a table in which the URLs of the original Web applications are added to the URLs in the URL table 610 (hereinafter, referred to as a URL-with-original Web application table 620). Note that the URL-with-original Web application table 620 does not necessarily need to include display positions.

Figure 12:
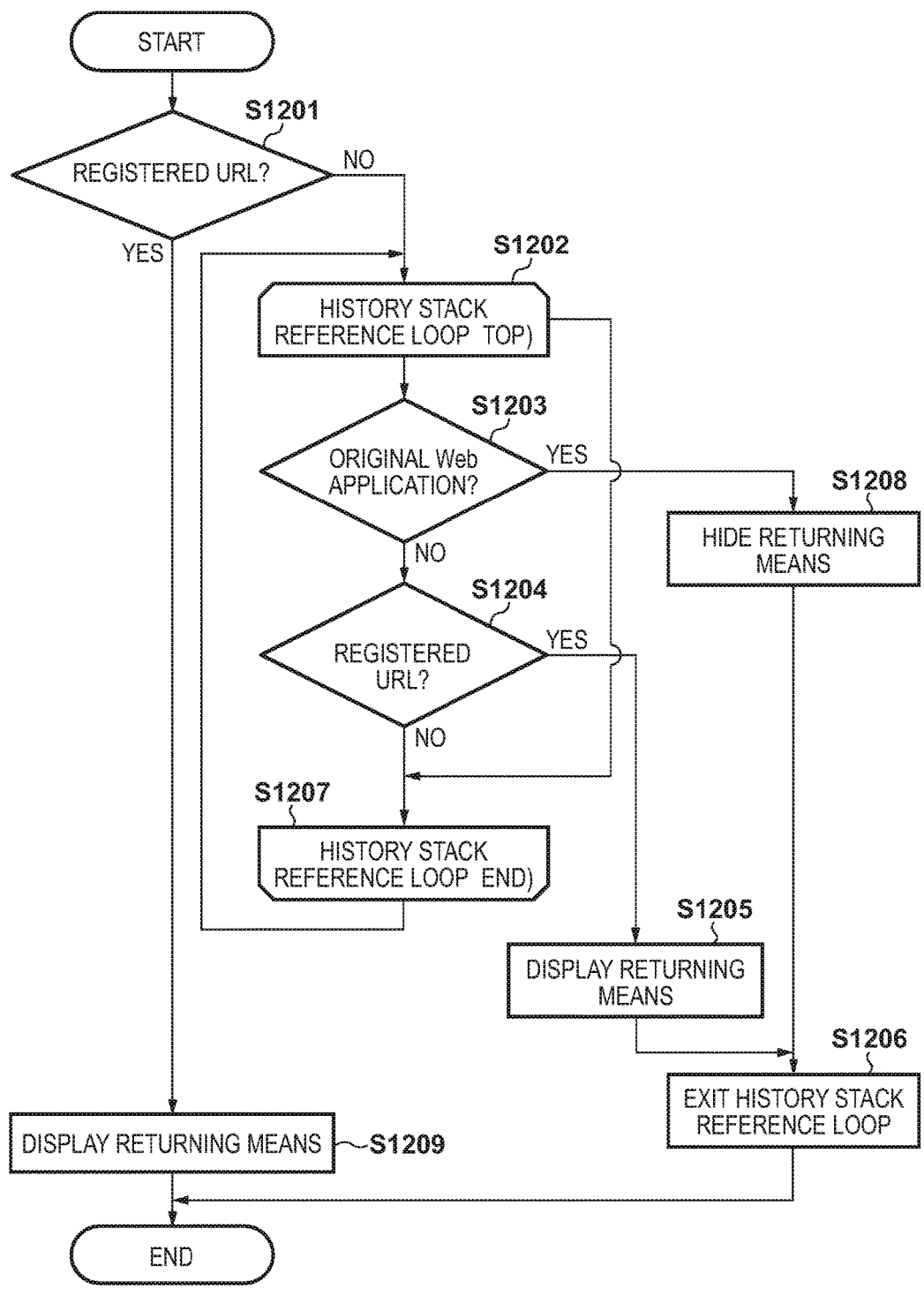
FIG. 12 is a flow of processing for determining whether or not to display a returning means, in an embodiment of the present invention.

FIG. 12 shows a flow of processing for determining whether or not to display a returning means in step S704 in FIG. 7, step S804 in FIG. 8, and step S1104 in FIG. 11.

In step S1201, the URL-with-original Web application table 620 is read out from a storage unit 304 of the Web browser 300, and it is determined whether or not a URL that matches the URL accessed when the HTTP request was transmitted in steps S702, S802, and S1102 is included as a URL for which returning means display is required. If it is determined in step S1201 that the accessed URL is not included in the URL-with-original Web application table 620 as a URL for which returning means display is required, the procedure branches to step S1202. On the other hand, if it is determined in step S1201 that the accessed URL is included in the URL-with-original Web application table 620 as a URL for which returning means display is required, the procedure branches to step S1209.

In step S1202, a loop starts in which history data is taken out from a stack in which history data from a history management unit 305 of the Web browser 300 is stored, in an order reversed from the order in which the history data was stored, and the data is then referenced. History data is sequentially stored, and thus forms a stack, and by taking out records in an order reversed from the order in which the data was stored, it is possible to track back the data from the most recent history in time series. Note that URLs that have been accessed are stored as records in a history stack, for example. Note that it is expressed here as "data is taken out", but it suffices that the content is referenced without changing the history stack. In addition, as long as it is possible to track back history data in time series, the structure of the data does not need to be a stack.

In step S1203, one record is taken out from the history stack, and it is determined whether or not the record matches the URLs of original Web applications in the URL table.

If the record does not match the URLs in step S1203, it is determined in step S1204 whether or not the URL accessed when the HTTP request was transmitted in steps S402, S702, and S1102 is included in URLs for which returning means display is required and that are stored in the URL-with-original Web application table 620. If it is determined that the accessed URL is included, the procedure branches to step S1205, and otherwise the procedure branches to step S1207.

Step S1205 is the same as steps S705, S805 and S1105. Specifically, a returning means such as a "Back" button is displayed over the current content display screen.

After a returning means is displayed in step S1205, the reference loop of the history stack is exited in step S1206.

If it is determined in S1204 that the URL accessed when the HTTP request was transmitted is not included in the URLs at which returning means display is required, and that are in a URL table, the position of the reference element of the history stack is returned by one reference element in step S1207.

If it is determined in step S1203 that one of the URLs of the original Web applications of the URL table matches the URL referenced from the history stack, a returning means is hidden in step S1208. This is because the screen transitions back to the original Web application of the URL at which a returning means is required, and the Web browser 300 is not required to be provided with a returning means any longer.

In step S1209, a tool bar including a "Back" button or the like is displayed. Step S1209 is the same as steps S705, S805 and S1105.

It is possible to determine whether to display or hide a tool bar by tracing back the history stack in this manner, for the following reason. In a browser-oriented Web application of an embedded device, there is a desire to save the space of the screen, and thus a tool bar is not usually displayed, and an address bar included in a tool bar is also not displayed. Therefore, it is not possible to directly input a URL to an address bar so as to cause screen transition. Screen transition is enabled by tracing a link in a displayed content. If the URL of a Web application in which the URL at which a returning means is displayed is registered appears before the URL at which a returning means is displayed, when the history stack is traced back, it can be determined that returning means display is not required. Conversely, if a URL at which a returning means is displayed appears before the URL of the original Web application, it can be determined that a returning means is required to be displayed.

Note that, in the procedure in FIG. 12, the premise is that the URL of the original Web application in which a URL for which the display of a returning means is required is registered (in other words, passed as a portion of a content to the Web browser 300) necessarily remains in the history stack. Therefore, a case is not envisioned where a stack is referenced to the most recent record, and there is no matching record in either step S1203 nor step S1204. However, in the case where a matching record cannot be found from the history, for example, a determination may be made to hide the returning means.

As described above, even in the case where a transition is made to a site other than originally envisioned external sites, it is possible to return appropriately, and thus the usability can be improved.

Note that the present invention is not limited to specifically disclosed working examples, and various variations and modifications are possible without departing from the scope of the claims.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment (s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-077735, filed Apr. 10, 2017 which is hereby incorporated by reference herein in its entirety.

What is claimed is:

1. An information processing apparatus comprising:
at least one processor and at least one memory coupled to each other and cooperating to act as:
a user interface that enables display on a screen and an operation performed by a user;
an acquisition unit configured to acquire content from a designated location; and
a control unit configured to, when displaying the content, additionally display, on the user interface, an operation portion for returning to a previous screen, if the location is a predetermined location,
wherein, in a case where a first location at which a Web application is provided is designated as the location, if an operation portion for returning to a previous screen is not displayed as a portion of content from the first location when displaying the content, and a second location designated next is the predetermined location, the control unit additionally displays the operation portion when displaying content from the second location.

2. The information processing apparatus according to claim 1,
wherein the control unit does not display the operation portion when content of the predetermined location is not displayed.

3. The information processing apparatus according to claim 1,
wherein the second location is a location at which an authentication service for receiving the Web application is provided.

4. The information processing apparatus according to claim 1,
wherein the control unit determines that content from the first location is displayed, using a script acquired as a portion of the content.

5. The information processing apparatus according to claim 1, further comprising:
a memory that stores history of accessed locations in time series,
wherein, if the second location is not the predetermined location, the control unit tracks back and references the history, and if there is a location in the history that matches the first location, does not display the operation portion, and, if there is a location in the history that matches the second location, displays the operation portion.

6. The information processing apparatus according to claim 1,
wherein the control unit acquires the predetermined location as a portion of the content from the designated location.

7. The information processing apparatus according to claim 1,
wherein the control unit acquires a position of the operation portion as a portion of the content from the designated location, and displays the operation portion at the position.

8. The information processing apparatus according to claim 1,
wherein a symbol of the designated location is displayed as the operation portion.

9. A non-transitory computer-readable medium that stores a program for causing a computer to function as:
a user interface that enables display on a screen and an operation performed by a user;
an acquisition unit configured to acquire content from a designated location; and
a control unit configured to, when displaying the content, additionally display, on the user interface, an operation portion for returning to a previous screen, if the location is a predetermined location,
wherein, in a case where a first location at which a Web application is provided is designated as the location, if an operation portion for returning to a previous screen is not displayed as a portion of content from the first location when displaying the content, and a second location designated next is the predetermined location, the control unit additionally displays the operation portion when displaying content from the second location.

10. The non-transitory computer-readable medium according to claim 9,
wherein the control unit does not display the operation portion when content of the predetermined location is not displayed.

11. The non-transitory computer-readable medium according to claim 9,
wherein the second location is a location at which an authentication service for receiving the Web application is provided.

12. The non-transitory computer-readable medium according to claim 9,
wherein the control unit determines that content from the first location is displayed, using a script acquired as a portion of the content.

13. The non-transitory computer-readable medium according to claim 9,
wherein the program further causes the computer to function as a storage unit that stores history of accessed locations in time series,
wherein, if the second location is not the predetermined location, the control unit tracks back and references the history, and if there is a location in the history that matches the first location, does not display the operation portion, and, if there is a location in the history that matches the second location, displays the operation portion.

14. The non-transitory computer-readable medium according to claim 9,
wherein the control unit acquires the predetermined location as a portion of the content from the designated location.

15. The non-transitory computer-readable medium according to claim 9, wherein the control unit acquires a position of the operation portion as a portion of the content from the designated location, and displays the operation portion at the position.

16. The non-transitory computer-readable medium according to claim 9,
wherein a symbol of the designated location is displayed as the operation portion.

17. A control method of an information processing apparatus that includes a user interface that enables display on a screen and an operation performed by a user, the method comprising:
acquiring content from a designated location; and
when displaying the content, additionally displaying, on the user interface, an operation portion for returning to a previous screen, if the location is a predetermined location,
wherein, in a case where a first location at which a Web application is provided is designated as the location, if an operation portion for returning to a previous screen is not displayed as a portion of content form the first location when displaying the content, and a second location designated next is the predetermined location, the control unit additionally displays the operation portion when displaying content from the second location.

* * * * *